(12) United States Patent
Hankins

(10) Patent No.: US 10,132,312 B1
(45) Date of Patent: Nov. 20, 2018

(54) SUPERIMPOSED STANDING VALVE

(71) Applicant: Dale Hankins, Bakersfield, CA (US)

(72) Inventor: Dale Hankins, Bakersfield, CA (US)

(*) Notice: Subject to any disclaimer, the term of this patent is extended or adjusted under 35 U.S.C. 154(b) by 0 days.

(21) Appl. No.: 15/660,668

(22) Filed: Jul. 26, 2017

(51) Int. Cl.
*F04B 53/12* (2006.01)
*F04B 47/02* (2006.01)
*F04B 53/10* (2006.01)
*E21B 43/12* (2006.01)
*F04B 53/16* (2006.01)
*F16K 1/12* (2006.01)

(52) U.S. Cl.
CPC .......... *F04B 53/128* (2013.01); *E21B 43/126* (2013.01); *F04B 47/02* (2013.01); *F04B 53/10* (2013.01); *F04B 53/125* (2013.01); *F04B 53/127* (2013.01); *F04B 53/162* (2013.01); *F16K 1/123* (2013.01)

(58) Field of Classification Search
CPC ...... F04B 47/02; F04B 53/125; F04B 53/127; F04B 53/128
See application file for complete search history.

(56) References Cited

U.S. PATENT DOCUMENTS

| 196,779 A | 11/1877 | Booth | |
|---|---|---|---|
| 1,696,007 A * | 12/1928 | Lewis | F04B 53/10 |
| | | | 137/533 |
| 2,723,625 A * | 11/1955 | Nichols | F16K 15/04 |
| | | | 417/259 |
| 3,074,352 A * | 1/1963 | Vincent | F04B 47/04 |
| | | | 417/259 |
| 4,557,668 A * | 12/1985 | Jones | F04B 53/06 |
| | | | 417/259 |
| 4,596,515 A * | 6/1986 | Simon | F04B 47/02 |
| | | | 417/259 |
| 6,537,042 B1 | 3/2003 | Stig Lundbäck | |
| 7,108,059 B1 * | 9/2006 | Lanier | E21B 43/127 |
| | | | 166/105 |
| 9,316,222 B2 | 4/2016 | Strahov et al. | |

FOREIGN PATENT DOCUMENTS

| CN | 203297087 U | 11/2013 |
|---|---|---|
| CN | 204003388 U | 12/2014 |
| CN | 204783587 U | 11/2015 |
| CN | 205243806 U | 5/2016 |

* cited by examiner

*Primary Examiner* — Peter J Bertheaud
(74) *Attorney, Agent, or Firm* — Matthew C. McCartney; Eastman & McCartney LLP

(57) ABSTRACT

The present invention is a superimposed standing valve and related method of harvesting oil and gas using a conventional rod pump equipped with the superimposed standing valve. The superimposed standing valve includes a donut disposed between a top cylinder and a main standing valve such that the donut can slide along the top cylinder a fixed valve stroke. A plurality of openings are sealed and unsealed by the movement of the donut. The superimposed standing valve isolates the pump from the head pressure of the oil and gas inside of the tubing thereby enabling the standing valve of the pump to remain open on both the upstroke and the downstroke. As a result, the superimposed standing valve increases pump efficiency and reduces the risk of gas locking.

12 Claims, 8 Drawing Sheets

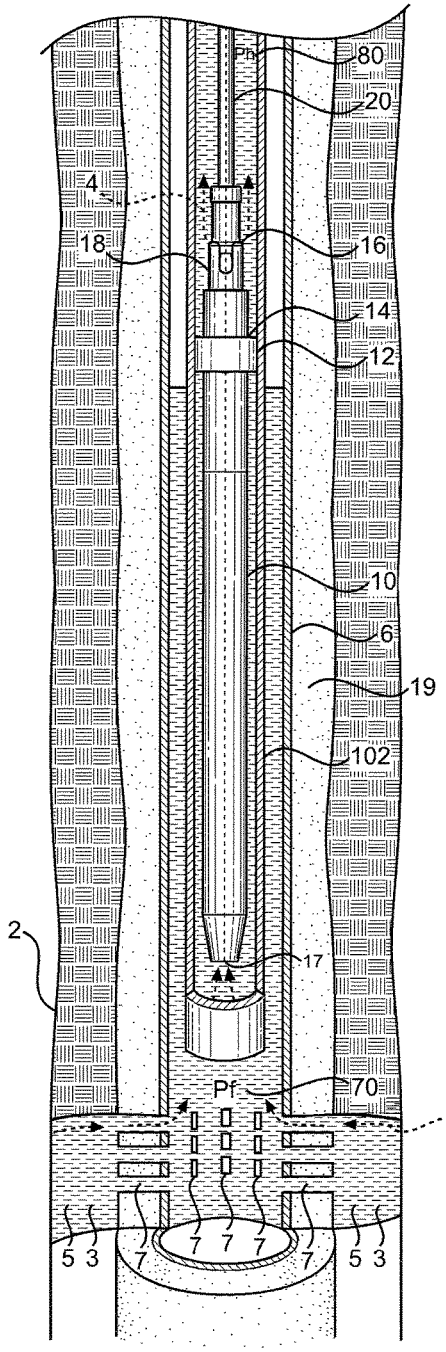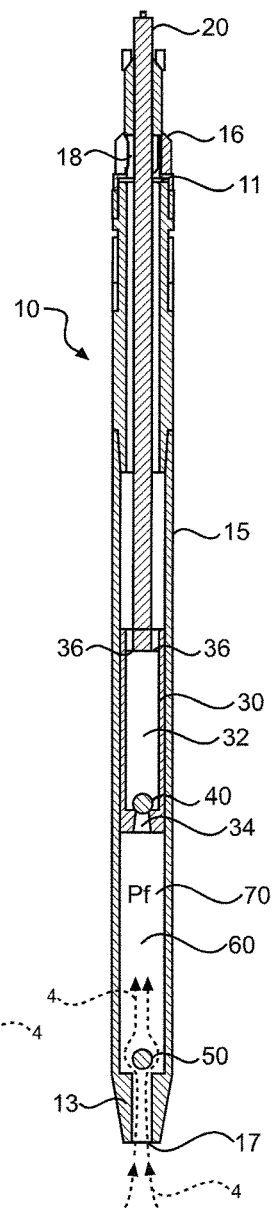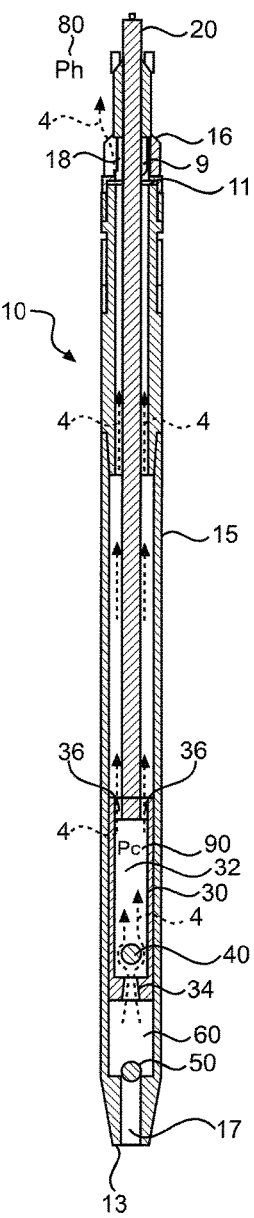

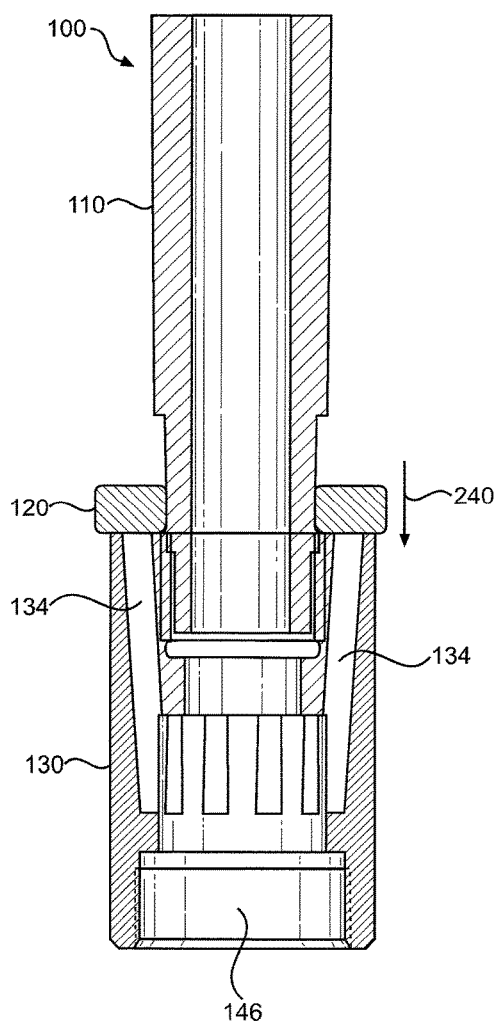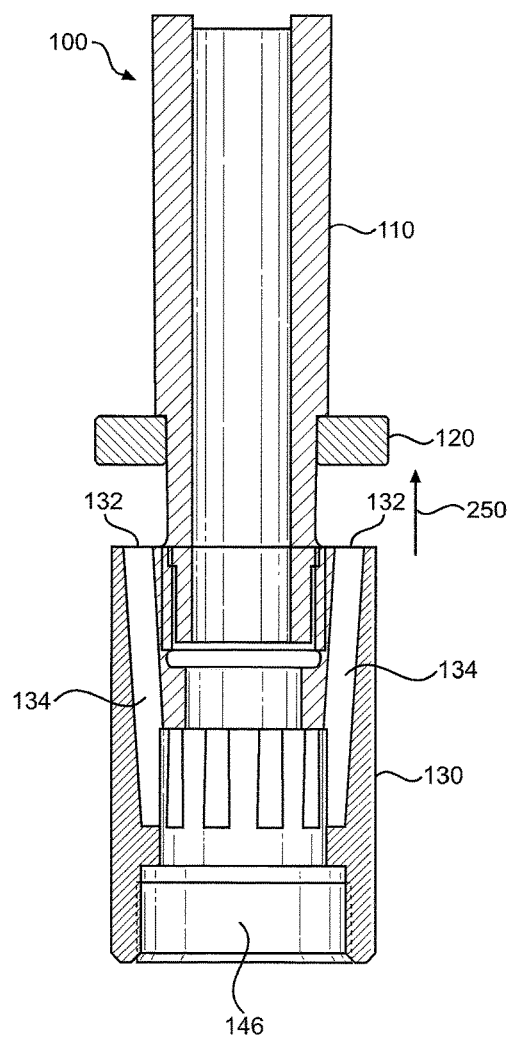

SUPERIMPOSED STANDING VALVE

BACKGROUND OF THE INVENTION

Conventional rod pumps are placed near the bottom of a casing in an oil well above a perforated section of the casing. The pump draws oil into the perforated section of the casing, through the pump, and into a tubing. The pump also lifts the oil up to the surface through the tubing by way of a lock, such as an API lock.

The simplest rod pump consists of a plunger which reciprocates inside a longer pump cylinder. The pump cylinder is secured to the tubing.

The plunger is sized to create a fluid seal between the outer diameter ("OD") of the plunger and the inner diameter ("ID") of the pump cylinder. The rod pump has two one-way check valves: a standing valve at the bottom of the pump and a traveling valve in the plunger.

A sucker rod string is connected to a pull rod on one end and is also connected at the other end to a surface pumping unit (often called a grasshopper). In turn, the opposite end of the pull rod is passed through a rod guide to the plunger of the pump. The grasshopper moves the sucker rod string (and the connected pull rod and plunger) up and down creating the up and downstroke of the plunger. As the sucker rod string and pull rod are lifted by the surface pumping unit, the plunger moves upward within the pump cylinder.

As the plunger moves upward, it lifts the oil within the tubing upward toward the surface and forms a pump chamber within the pump cylinder between the pump bottom and the plunger. As the plunger moves upward, pressure decreases in the pump chamber allowing formation pressure to exceed pressure in the pump chamber, which in turn, causes the standing valve to open and oil to enter into the pump chamber through the open standing valve.

In an ideal environment, as the plunger moves downward during the downstroke, the pump chamber decreases in volume and causes the pressure in the pump chamber to exceed the head pressure from fluid in the tubing above the pump and allows the traveling valve to open and oil to pass from the pump chamber to the tubing above the pump. However, no oil enters the pump chamber during the downstroke as the head pressure ensures that the standing valve remains closed. During the upstroke, as the plunger moves upward, the pump chamber increases in volume and causes pressure in the pump chamber to decrease. Once the pump chamber pressure is lower than the head pressure, the head pressure forces the traveling valve closed. With the traveling valve closed, the standing valve will open once the chamber pressure is less than the formation pressure. Thus, even in an ideal environment, through approximately one-half the pump cycle, the standing valve is closed and no oil enters the well.

Further, often there are problems that can occur downhole that further decrease the operational efficiency of conventional rod pumps. One such problem is gas locking. In a typical oil well, oil with dissolved gas or gas from the surrounding formations enter the conventional rod pump. If the ratio of gas to oil entering the pump becomes too high, gas locking can occur. More specifically, the presence of too much gas in the pump chamber results in a peak pressure within the pump chamber that is insufficient to overcome the hydrostatic pressure, resulting in the traveling valve remaining closed on the downstroke. Similarly, the presence of too much gas also precludes sufficient reduction in chamber pressure during the upstroke to open the standing valve. Under such a gas locked condition, the pump simply reciprocates without moving any oil, wasting substantial energy and prematurely wearing the component parts of the pump.

Further, due to the high cost of energy, oil pumps are often shut down in frequent intervals in order to save energy costs. During periods when the pump is shut down, sand and silt mixed in the oil collected in the tubing above the pump begins to settle onto and ultimately reenters the pump. The sand and silt that accumulates in the pump during pump shut down periods causes premature wear on the plunger and traveling valve.

Thus, there is a need for a device that easily mounts to a conventional rod pump that increases its efficiency by increasing the time the standing valve remains open during the pump's operation. There is a further need for a device that reduces the risk of gas locking. There is a further need for a device that prohibits sand and silt mixed with oil in the tubing above the pump from settling back into the pump during periods when the pump is shut down.

SUMMARY OF THE INVENTION

The present invention is a superimposed standing valve that enables oil and gas to pass into the pump chamber on both the upstroke and the downstroke of a conventional rod pump, thereby increasing the efficiency of the rod pump and reducing the risk of gas locking (a condition where no oil enters the pump chamber during multiple up and downstrokes). The present invention achieves this result through isolation of the head pressure from the pump components on the downstroke. The present invention further prevents sand and silt mixed in the oil stored within the tubing from settling into the pump and thereby extends the life span of the pump.

The superimposed standing valve is sized to mate with a conventional rod pump, a conventional API locking system and a conventional polished rod guide. The primary components of the superimposed standing valve include a top cylinder connected to a main standing valve with a donut slidably connected on the top cylinder such that it can open and close the main standing valve. The donut is capable of reciprocal movement with respect to the top cylinder over a fixed stroke distance. The superimposed standing valve requires the substitution of a conventional pull rod with a polished rod.

The top cylinder of the superimposed standing valve has a central passage open at both the top cylinder top and top cylinder bottom and sized to slidably receive the polished rod. Similarly, the main standing valve has a central bore open at the main valve top and at the main valve bottom that allows for the polished rod to pass from the top cylinder, through the main valve central bore, and ultimately connect to a plunger of a conventional rod pump. The main valve central bore expands to form a central manifold adjacent the main valve bottom such that the manifold diameter is larger than the main valve central bore diameter so as to enable the flow of fluid into the central manifold despite the presence of a polished rod in the main valve central bore.

The polished rod has a smooth surface and is machined or manufactured to have an outer diameter approximately 3/1,000 to 10/1,000 on an inch smaller than the diameter of the central passage of the top cylinder. The central passage of the top cylinder is also machined or manufactured to have a honed inner surface and to ensure the proper tolerance with respect to the polished rod outer diameter is achieved. The polished rod properly dimensioned with respect to the honed inner surface of the central passage enables the polished rod to reciprocate with respect to the top cylinder while simultaneously maintaining a fluid seal to preclude the passage of oil from the tubing downward through the central passage. As set forth further below, this fluid seal also ensures that the pump remains isolated from the head pressure Ph within the tubing when the superimposed standing valve is closed.

The main standing valve component has a plurality of openings on the main valve top that are each connected to the central manifold by a slanted passageway. The plurality of openings are equally spaced from one another and encircle the main valve central bore. The plurality of openings, the slanted passageways, and the central manifold are each in fluid communication with the outlet of the conventional rod pump. The number and placement of the plurality of openings with respect to one another ensures that the flow of oil is evenly applied to the donut during the upstroke of the polished rod which maximizes the efficiency of the movement of the donut.

In use, the superimposed standing valve is connected between a conventional rod guide and a conventional rod pump, which is secured to the surrounding oil well tubing with a conventional API locking system. One end of the polished rod is connected down hole of the oil well, through the rod guide, through the central passage of the top cylinder and through the main valve central bore of the superimposed standing valve, and ultimately into a pump cylinder of a conventional rod pump where it is connected to the plunger of the pump. The other end of the polished rod is connected to the end of a sucker rod string, which in turn is connected to a reciprocating mechanical device known in the art, such as a pump jack. As the sucker rod string and polished rod are moved by the mechanical device up and down, the superimposed standing valve reciprocates between an open position and a closed position.

When in a closed position, the donut rests securely on the plurality of openings and seals them from the oil and gas in the tubing above the pump, and the resulting head pressure (Ph) in the tubing above the superimposed standing valve. When in an open position, oil and gas flow freely from the pump outlet, into the central manifold, through the slanted passageways and out the plurality of openings into the tubing above the pump and superimposed standing valve. The existing pump already has a pump chamber located between the bottom of the plunger (having a traveling valve) and the inlet of the pump (having a standing valve). However, the addition of the superimposed standing valve creates a valve chamber between the plunger and the donut.

As the polished rod moves the plunger upward during the upstroke, the volume of the pump chamber increases while the volume of the valve chamber decreases. Therefore, during the upstroke, the pressure of the pump chamber (Pc) decreases while the pressure of the valve chamber (Pv) increases.

On the upstroke, the decreasing pump chamber pressure Pc enables the standing valve to be opened by the greater formation pressure (Pf), thereby forcing oil and gas into the pump chamber. Simultaneously oil and gas that entered the valve chamber on the previous downstroke, is pushed by the plunger into the central manifold. Once the valve pressure Pv exceeds the head pressure Ph, the flowing oil and gas will flow through the central manifold, slanted passageways and out the plurality of openings where it enters the tubing above the superimposed standing valve.

Ordinarily, on the downstroke of a conventional pump, the traveling valve located in the plunger will not open until the chamber pressure Pc exceeds the head pressure Ph in the tubing. Moreover, on the downstroke, the standing valve remains closed. With the inclusion of the superimposed standing valve, during the downstroke, the donut closes as soon as head pressure Ph exceeds the valve pressure thereby isolating the pump from the head pressure. More specifically, a fluid seal is created between the honed inner surface of the central passage and the outer polished surface of the polished rod. This fluid seal coupled with the seal provided by the donut on the downstroke ensures that the pump chamber is isolated from head pressure (Ph) in the tubing created by the oil above the superimposed standing valve. This resulting isolation allows the pressure in the pump chamber Pc to remain lower than the formation pressure Pf.

As a result, the pump chamber pressure Pc merely must exceed the valve pressure Pv in order for the traveling valve to open. So equipped, the requisite pressure needed to open the traveling valve is much less than the head pressure Ph thereby increasing pump efficiency. Further this requisite pressure is often lower than the surrounding formation pressure thereby enabling the standing valve to remain open, even on the downstroke.

In the event that the presence of too much gas precludes obtaining a valve pressure Pv in excess of head pressure, the donut remains closed allowing the pump to operate more efficiently without having to overcome head pressure on the upstroke thereby quickly enabling sufficient quantities of oil to enter the valve chamber and preclude a gas locking condition.

A primary advantage of a pump equipped with the superimposed standing valve invention is a constant flow of oil into the pump through the standing valve on both the upstroke and the downstroke. This increases pump efficiency and reduces the risk of gas locking. The superimposed standing valve's isolation of the traveling valve and standing valve from the head pressure during the downstroke reduces the risk of gas locking because the chamber pressure remains lower than the formation pressure enabling both the standing valve and the traveling valve to remain open during the downstroke. Moreover, the superimposed standing valve also reduces the risk of gas locking because in the event too much gas is present in the pump and valve to open the donut, the pump will continue to operate isolated from the head pressure until sufficient quantities of oil are collected in the valve chamber to create a valve pressure sufficient to overcome the head pressure.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein:

FIG. 1 is a cutaway view of a standard oil well casing and oil well tubing showing a standard prior art oil well pump locked within the tubing and equipped with a standing valve and a traveling valve and an API lock and rod guide;

FIG. 2 is a cross sectional view of the standard prior art oil well pump shown in FIG. 1 and showing plunger on upstroke with the standing valve open and the traveling valve closed;

FIG. 3 is a cross sectional view of the standard prior art oil well pump shown in FIG. 1 and showing the plunger on the downstroke with the standing valve closed and the traveling valve open;

FIG. 9B is cross-sectional view of the superimposed standing valve in a closed position with the polished rod omitted from view and showing the donut in a closed position sealing the plurality of openings;

FIG. 9C is a cross-sectional view of the superimposed standing valve in an open position with the polished rod omitted from view and showing the donut unsealed from the plurality of openings;

DETAILED DESCRIPTION OF THE INVENTION

Figure 4:
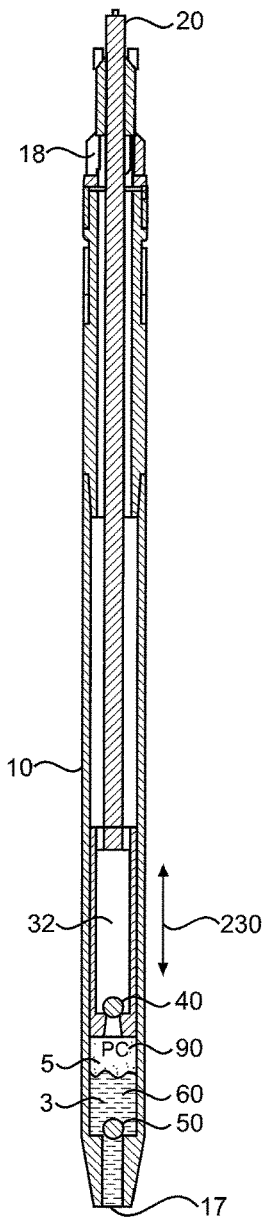
FIG. 4 is a cross sectional view of the standard prior art oil well pump shown in FIG. 1 with and showing the pump in a gas locked condition with the standing valve and the traveling valve both closed.

Referring first to FIGS. 1-3, a conventional rod pump 10 is generally shown. In FIG. 1, the conventional rod pump 10 is shown within and near the bottom of an oil well casing 6, which in turn is secured within the ground 2. Oil 3 and gas 5 are drawn into the oil well casing 6 at perforations 7 in the oil well casing 6, below the rod pump 10. The rod pump 10 is secured within and to the tubing 102 using conventional equipment, such as an API lock 12.

One end of a pull rod 20 is inserted through a pump rod guide 16 into the rod pump 10 while the other end of the pull rod 20 is connected to a sucker rod string (not shown). The sucker rod string is connected to mechanical devices on the surface, such as a pump jack, which are omitted from the figures and well known in the art. The pump jack and sucker rod system cause the pull rod 22 to reciprocate in the rod pump 10 and provides the necessary kinetic energy for the rod pump 10 to function.

The rod pump 10 has a pump top 11 and a pump bottom 13 on either end of a pump cylinder 15. The rod pump 10 has a pump inlet 17 at the pump bottom 13 and a pump outlet 18 in a rod guide 16 mounted to the pump top 11. The pump 10 is secured to the rod guide 16 by pump threads 9.

The second end of the pull rod 22 is passed through the rod guide 16, into the pump cylinder 15 and is connected to a plunger 30. The plunger 30 is disposed within the pump cylinder 15 and is connected to the pull rod 20. The plunger 30 is capable of reciprocal movement within the pump cylinder 15. The plunger 30 has a plunger chamber 32 with a plunger inlet 34 and a plunger outlet 36. A traveling valve 40 is connected to the plunger inlet 34 such that traveling valve 40 can open and close at the plunger inlet 34. The plunger 30 slides within the pump cylinder 15 thereby forming a pump chamber 60, the volume of which expands and contracts with the reciprocal movement of the plunger 30.

Formation pressure Pf 70 in the ground surrounding the casing 6 drives oil 3 and gas 5 along flow path 4, through the perforations 7 and into the casing 6. However, oil and gas wells are hundreds to many thousands of feet deep, and therefore head pressure Ph 80 created by the weight of oil 3 within the tubing 102 can be substantial and typically is greater than formation pressure Pf 70. Thus, the pump 10 is required to overcome head pressure Ph 80 to bring oil 3 and gas 5 into the tubing 102 above the rod pump 10, and therefor ultimately to the surface.

At all times, without the benefit of the invention, the pump cylinder 15 above the plunger 30 is subject to the head pressure Ph 80 in the tubing 102 resulting from the weight of the oil 3 and gas 5 above the rod pump 10.

As the plunger 30 is moved towards the bottom 13 of the pump 10, the pump chamber 60 decreases in volume and the chamber pressure Pc 90 increases until the chamber pressure Pc 90 exceeds the head pressure Ph 80 thereby causing the traveling valve 40 to open. Once the traveling valve 40 is open, oil 3 and gas 5 can pass into the plunger chamber 32 through the plunger chamber inlet 34 until the plunger completes its downstroke and begins its upstroke.

On the upstroke, as the plunger 30 is moved towards the top 11 of the pump 10, the pump chamber 60 increase in volume and the chamber pressure Pc 90 decreases. When the chamber pressure Pc 90 is less than the head pressure Ph 80, the traveling valve 40 closes. Once the traveling valve 40 is closed, the expanding volume of the pump chamber 60 causes the chamber pressure Pc 90 to become less than the formation pressure Pf 70. Once the formation pressure Pf 70 is greater than the chamber pressure Pc 90, the standing valve 50 opens and oil 3 and gas 5 enter the pump inlet 17 and into the pump chamber 60.

As the pump cycle repeats, oil 3 and gas 5 passed into the plunger chamber 32 pass through the pump chamber outlets 36 and into the pump cylinder 15. The reciprocating plunger 30 lifts oil 3 and gas 5 out of the pump cylinder 15, through pump outlet 18 in the rod guide 16 and into the tubing 102 above the pump 10. So long as the pump 10 continues to deliver oil 3 into the tubing 102, the pump 10 will fill the tubing 102 with oil 3 until it reaches the surface where it can be collected.

However, a primary inefficiency in the pump 10 and process shown in FIGS. 1-3 is that at all times the pump 10 must work to overcome the head pressure Ph 80 in the tubing 102. Moreover, problems can arise if too much gas enters the pump chamber 60.

FIG. 4 shows the conventional pump 10 disclosed in FIGS. 1-3 operating when too little oil 3 is located in the pump chamber 60 and as a result, the chamber pressure Pc 90 is insufficient to open the traveling valve 40. As a result, no oil 3 or gas 5 is passed into the plunger chamber 32. Such a condition is known in the art as gas locking. Moreover, the head pressure Ph 80 acting against the chamber pressure Pc 90 reduces the allowable amount of gas 5 that can be present in the pump chamber 60 before gas locking occurs.

The present invention seeks to improve the operational efficiency of the rod pump 10 and reduce the risk of gas locking through isolation of the pump 10 from head pressure Ph 80 during the downstroke thereby increasing the probability that the traveling valve 40 will open on the downstroke and the standing valve 50 will remain open on the reciprocating motion 230.

Figure 5A:
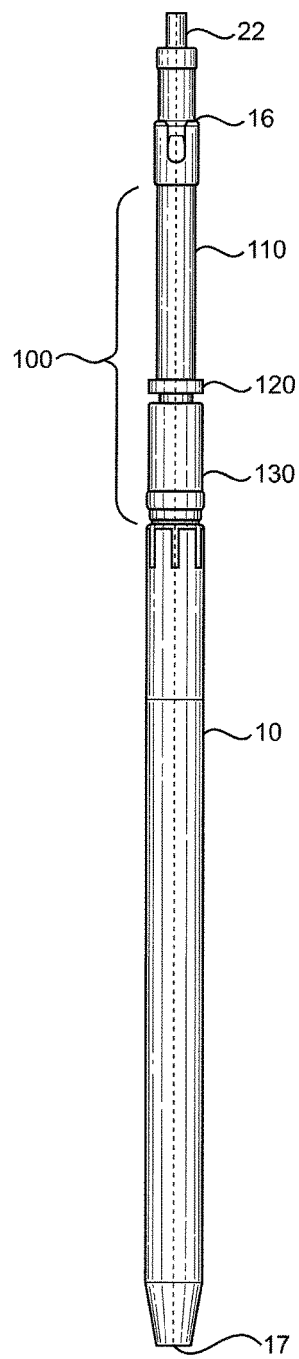
FIG. 5A is a side view of a standard oil well pump equipped with a superimposed standing valve on the upstroke with the donut open.
Figure 5B:
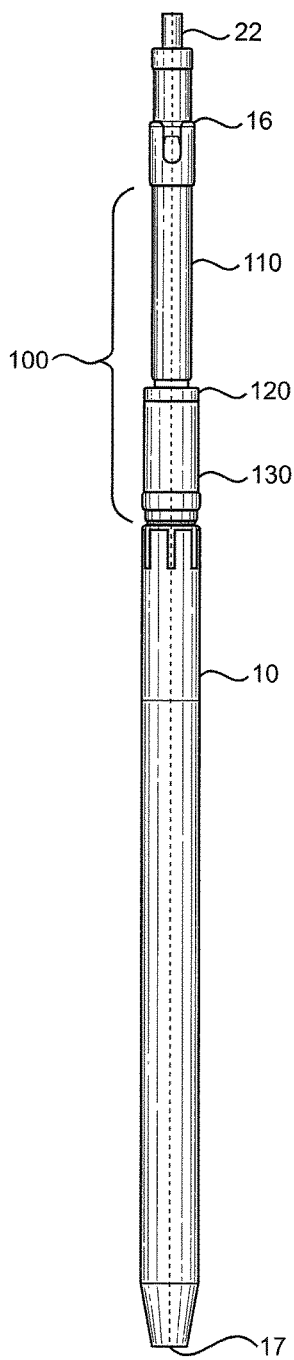
FIG. 5B is a side view of a standard oil well pump equipped with a superimposed standing valve on the downstroke with the donut closed.

Turning to FIGS. 5A and 5B, a superimposed standing valve 100 is shown disposed between a conventional rod pump 10 and a rod guide 16. The superimposed standing valve 100 has a donut 120 that reciprocates along a top cylinder 110 to open and close a main standing valve 130. FIG. 5A shows the superimposed standing valve 100 during the upstroke of a polished rod 22 connected to the rod pump 10 with the donut 120 in the open position. FIG. 5B shows the superimposed standing valve 100 during the downstroke of the polished rod 22 and pump 10 with the donut 120 in the closed position.

Figure 6A:
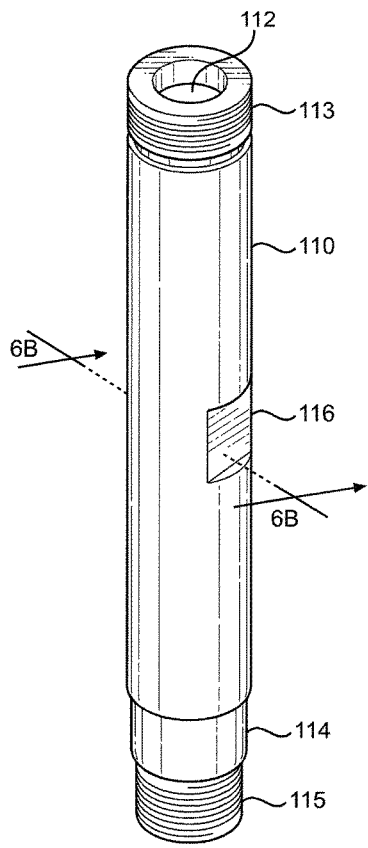
FIG. 6A is an isometric view of the top cylinder of the superimposed standing valve and showing the honed central passage in the top cylinder.
Figure 6B:
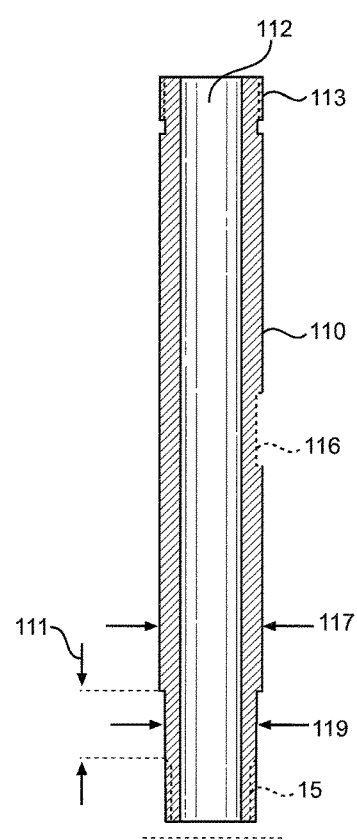
FIG. 6B is a cross-sectional of the top cylinder shown in FIG. 6A, and showing a top cylinder reduced diameter section along a stroke length sized to slidably receive the donut shown in FIGS. 7A through 7C.

Turning to FIGS. 6A and 6B, the upper cylinder 110 of the superimposed standing valve 100 is generally shown with a central passage 112 sized to slidably receive a polished rod 22 (omitted from view). Top cylinder upper threads 113 are provided adjacent the top of the top cylinder 110 and sized to securely mount to a rod guide 16. Top cylinder lower threads 115 are provided adjacent the bottom of the top cylinder 110 and sized to securely mount to the main standing valve 130 (shown in FIGS. 8A through 8C). The top cylinder 110 has a top cylinder diameter portion 117 and a top cylinder reduced diameter portion 119. The top cylinder reduced diameter portion 119 is sized to receive the donut 120 (shown in FIGS. 7A and 7B). The top cylinder reduced diameter 119 portion has a valve stroke length 111. A wrench indent 116 is provided on the top cylinder diameter portion 117 to allow for an increased gripping surface for a tool such as a wrench when connecting or disconnecting the superimposed standing valve 100 to and from the rod pump 10.

Figure 7A:
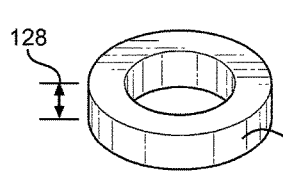
FIG. 7A is an isometric view of the donut of the superimposed standing valve and showing a donut aperture with an inner diameter that is slightly larger than the top cylinder reduced diameter shown in FIG. 6B.
Figure 7B:
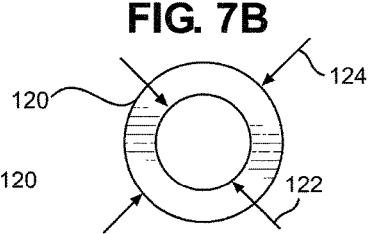
FIG. 7B is a top view of the donut shown in FIG. 7A.

Turning to FIGS. 7A and 7B, the donut 120 of the superimposed standing valve 110 is generally shown with donut inner diameter 122 and a donut outer diameter 124 with a donut thickness 128. The donut inner diameter 122 is slightly larger than the diameter of the top cylinder reduced diameter portion 119 of the top cylinder 110 to facilitate the sliding of the donut 120 along the valve stroke 111 of the top cylinder 110. The donut outer diameter 124 is sized to seal the main standing valve 130 on the downstroke of the rod pump 10.

Figure 7C:
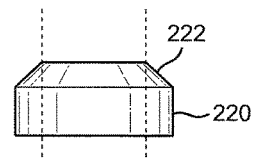
FIG. 7C is a side view of an alternative embodiment of the donut and showing a profiled top surface designed to limit the accumulation of sand and silt on the top surface of the donut during periods of non-use.

Turning to FIG. 7C, an alternative embodiment of the donut 220 is shown with a profiled top surface 222. The profiled top surface 222 has a geometric profile sized to limit the accumulation of settling sand and silt during periods of non-use.

Figure 8A:
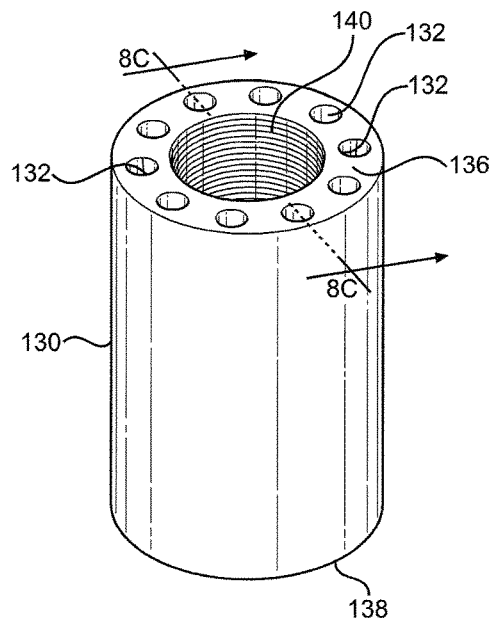
FIG. 8A is an isometric view of the main valve body of the superimposed standing valve and showing a plurality of openings at the top of the main valve body encircling a central bore.
Figure 8B:
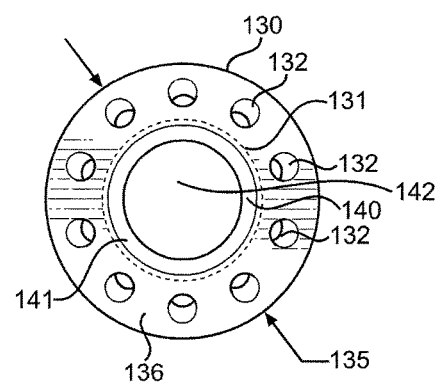
FIG. 8B is a top view of the valve body shown in FIG. 8A and showing the equal spacing between the plurality of openings with the plurality of openings encircling the top cylinder receiver.
Figure 8C:
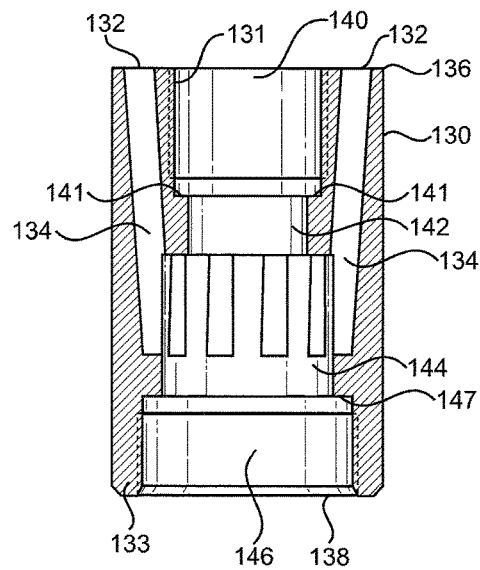
FIG. 8C is a cross-sectional view of the valve body shown in FIG. 8A and showing a central manifold connected to the plurality of openings by corresponding slanted passageways.

Turning to FIGS. 8A through 8C, the main standing valve 130 of the superimposed standing valve 100 is generally shown with a main valve central bore 142 allowing for the passage of the polished rod 22 through the main standing valve 130. The main standing valve 130 has a main valve top 136 and a main valve bottom 138.

The main valve top 136 has a top cylinder receiver 140 with main valve top threads 131 and a top cylinder receiver seat 141. The top cylinder receiver 140 is sized to securely receive the top cylinder lower threads 115 of the top cylinder 110 and secure the top cylinder 110 against the top cylinder receiver seat 141.

Similarly, the main valve bottom 138 has a pump receiver 146 with main valve bottom threads 133 and a pump receiver seat 147. The pump receiver 146 is sized to securely receive the pump threads 9 of the pump 10 and secure the pump 10 against the pump receiver seat 147. Disposed between top cylinder receiver 140 and pump receiver 146 is a central manifold 144.

A plurality of openings 132 are located on the main valve top 136 and encircle the top cylinder receiver 140. Each opening 132 is connected to and in fluid communication with the central manifold 144 by way of a slanted passageway 134. The main standing valve 130 has a main standing valve diameter 135 that is approximately equal to the donut outer diameter 124 of the donut 120.

Figure 9A:
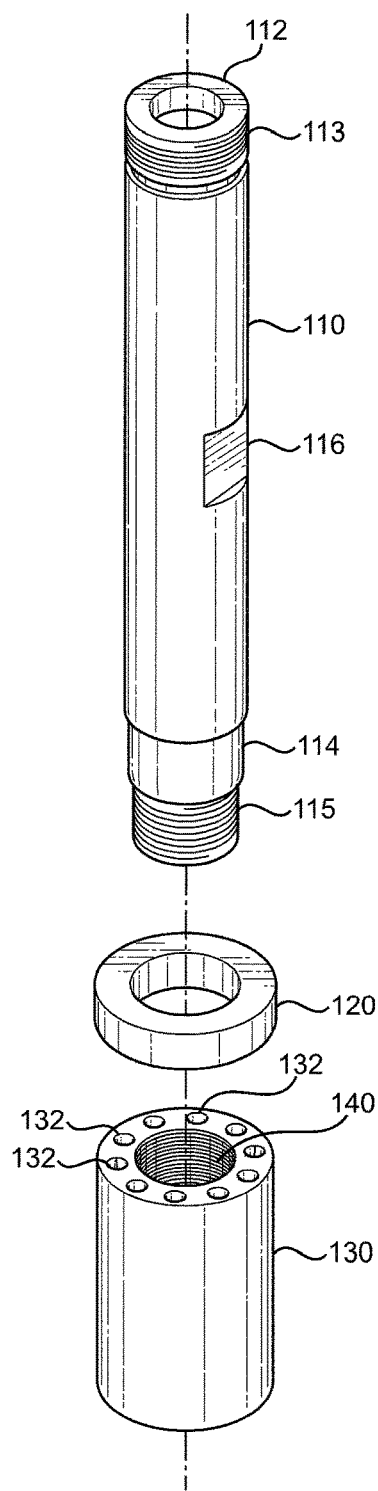
FIG. 9A is an isometric assembly view of the superimposed standing valve showing the donut disposed between the top cylinder and the main valve body.

Turning to FIG. 9A, an assembly view of the superimposed standing valve 100 is generally shown and showcases the placement of the donut 120 between the main standing valve 130 and the top cylinder 110.

Turning to FIGS. 9B and 9C, cross-sectional views of the assembled superimposed standing valve 100 are generally shown with the polished rod 22 omitted from the Figures. In FIG. 9B, superimposed standing valve 100 is shown in a closed position with the donut 120 in a down position 240 in contact with the main valve top 136 of the main standing valve 130 such that the plurality of openings 132 are sealed by the donut 120. In FIG. 9C, the superimposed standing valve 100 is shown in an open position with the donut 120 in an up position 250 slid away from the main valve top 136 along the valve stroke 111 of the top cylinder 110. The top cylinder diameter 117 of the top cylinder 110 is larger than the donut inner diameter 122 of the donut 120 and therefore precludes the donut 120 from traveling beyond the valve stroke 111.

Figure 10A:
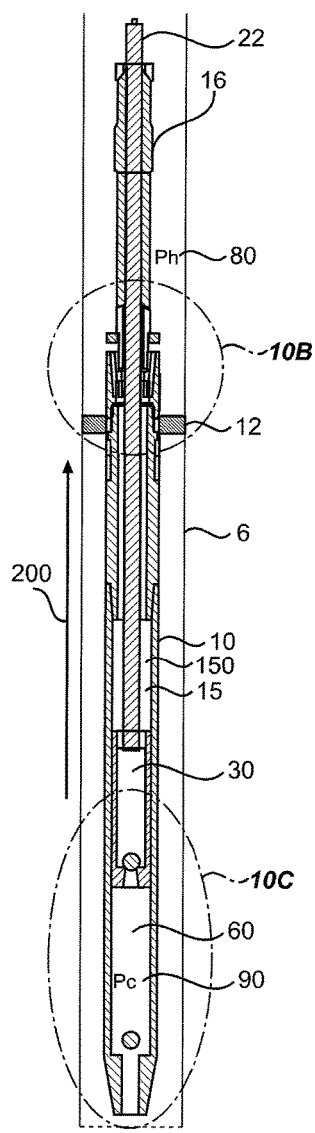
FIG. 10A is a cross-sectional view of the standard oil well pump equipped with a superimposed standing valve shown in FIG. 5A and showing the plunger on the upstroke with the standing valve open, the traveling valve closed and the flow path of fluid through the pump and superimposed standing valve.
Figure 10B:
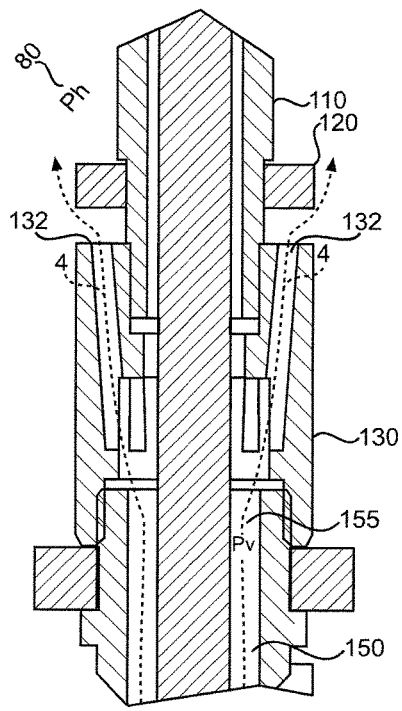
FIG. 10B is a detail view of the superimposed standing valve from 10A and showing the flow path of fluid through the superimposed standing valve.
Figure 10C:
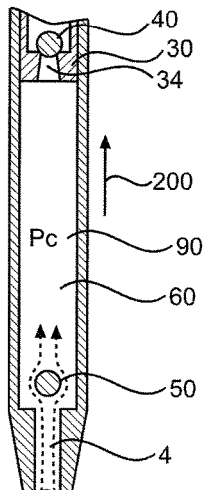
FIG. 10C is a detail view of the pump shown in 10A and showing the flow path of fluid into the pump on the upstroke.

Turing to FIGS. 10A though 10C, the superimposed standing valve 100 is shown in use with a conventional rod pump 10 during the upstroke of the polished rod 22. The polished rod 22 passes through the rod guide 16, through the central passage 112 of the top cylinder 110, through the main valve central bore 142 and into the pump cylinder 15 where it is connected to the plunger 30 the rod pump 10.

The inclusion of the superimposed standing valve 100 between the rod guide 16 and the pump 10 creates a valve chamber 150 between the central manifold 144 of the main standing valve 130 and the plunger 30 of the pump 10, with a valve chamber volume at a valve pressure Pv 155. As the plunger 30 moves in the up direction 200, the pump chamber 60 volume increases while the valve chamber 150 volume decreases. Similarly, as the plunger 30 moves in the up direction 200, the chamber pressure Pc 90 decreases while the valve pressure Pv increases. Once the valve pressure Pv 155 exceeds the head pressure Ph 80, the donut 120 unseals from the main valve top 136 thereby enabling oil 3 and gas 5 to travel from the central manifold 144, through slanted passageways 134, and out the plurality of openings 132 and into the casing 6, above the pump 10 and API lock 12.

Also during the upstroke, as the plunger 30 moves in up direction 200, the chamber pressure Pc 90 is less than the formation pressure Pf 70, thereby ensuring that the standing valve 50 remains up. The formation pressure Pf 70 then drives oil 3 and gas 5 into the inlet 17 of the rod pump 10 and into the pump chamber 60.

During the upstroke, the moment the valve pressure Pv 155 exceeds the chamber pressure Pc 90 of the pump 10, the traveling valve 40 closes, thereby isolating the standing valve 50 and pump chamber 60 from the head pressure Ph 80.

Figure 11A:
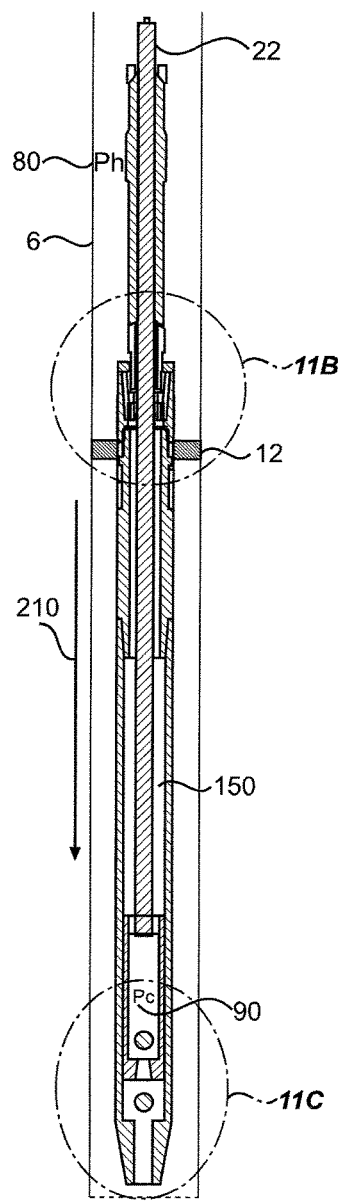
FIG. 11A is a cross-sectional view of the standard oil well pump equipped with a superimposed standing valve shown in FIG. 5B and showing the plunger on the downstroke with the standing valve open and the traveling valve open and the flow path of fluid through the pump and superimposed standing valve.
Figure 11B:
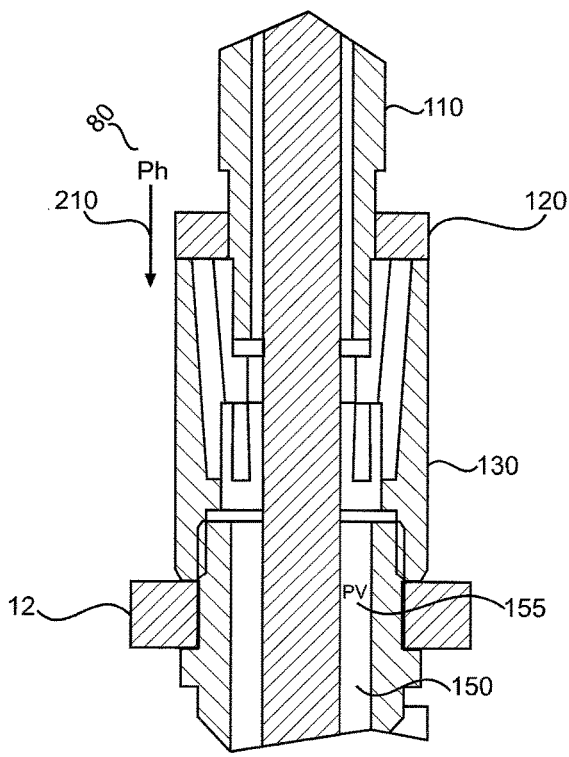
FIG. 11B is a detailed view of the superimposed standing valve from 11A and showing no flow of fluid through the superimposed standing valve.
Figure 11C:
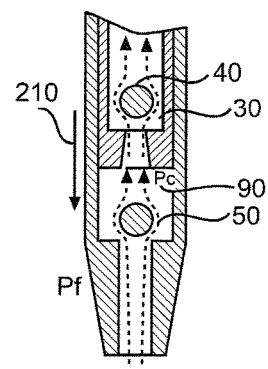
FIG. 11O is a detail view of the pump shown in 11A showing the flow of fluid into the pump on the downstroke.

Turning next to FIGS. 11A through 11C, the superimposed standing valve 100 is shown in use with a conventional rod pump 10 during the downstroke of the polished rod 22 and plunger 30. As the plunger 30 moves in the down direction 210, the pump chamber 60 volume decreases while the valve chamber 150 volume increases. Similarly, as the plunger 30 moves in the down direction 210, the chamber pressure Pc 90 increases while the valve pressure Pv 155 decreases. Once the head pressure Ph 80 exceeds the valve pressure Pv 155, the donut 120 is forced back down the valve stroke 111 until the donut seats on the main valve top 136 and seals the plurality of openings 132. Once so sealed, the main standing valve 130 and pump 10 are isolated from the head pressure Ph 80.

The isolation of the main standing valve 130 from the head pressure Ph 80 during the downstroke greatly increases the efficiency of the pump 10 on the downstroke. As the plunger 30 continues to move in down direction 210, while isolated from the head pressure Ph 80, the chamber pressure Pc 90 no longer has to overcome the head pressure Ph 80 in order to open the traveling valve 40. Instead, the chamber pressure Pc 90 merely has to overcome the valve pressure Pv 155 in order to open the traveling valve 40, which is a significantly lower pressure than the existing head pressure Ph 80. In many instances, this requisite pressure is lower than the surrounding formation pressure Pf 70. As a result, even on the downstroke, the standing valve 50 remains open. More specifically, since during the downstroke the increasing chamber pressure Pc 90 is only attempting to overcome the decreasing valve pressure Pv 155 without the additional burden of the head pressure Ph 80, the formation pressure Pf 70 will exceed the chamber pressure Pc 90 on the downstroke thereby ensuring that the standing valve 50 remains open.

Therefore, the superimposed standing valve 100 enables the standing valve 50 of a conventional rod pump 10 to be open both on the upstroke and the downstroke, thereby increasing the efficiency of the rod pump 10 since fluid enters the pump 10 both on the upstroke and the downstroke. Moreover, the efficiency of the pump 10 is further improved because the pump 10 does not have to overcome the head pressure Ph 80 in order to move oil 3 and gas 5 into the pump 10. These increases in efficiency also decrease the likelihood of gas locking because the pump 10 can now draw oil 3 into the plunger chamber 32 at pressures much lower than the head pressure Ph 80.

An additional benefit of the superimposed standing valve 100 is that the donut 120 prohibits oil 3 and gas 5 from settling into the pump 10 during periods of non-use. When the pump 10 is stopped, the head pressure Ph generated by the column of oil 3 and gas 5 above the valve 100 causes the donut 120 to quickly seal on the main valve 130. Once so sealed, all settling debris in the column of oil 3 and gas 5 have no flow path into the pump 10, thereby increasing the lifespan of the component parts of the pump 10, including the plunger 30, standing valve 50, and traveling valve 40.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

While there have been shown what are presently considered to be preferred embodiments of the present invention, it will be apparent to those skilled in the art that various changes and modifications can be made herein without departing from the scope and spirit of the invention. Accordingly, the invention is not to be limited as except by the appended claims.

I claim:

1. A superimposed standing valve comprising:
a top cylinder with a top cylinder top and a top cylinder bottom with a central passage through said top cylinder wherein said central passage is sized to slidably receive a polished rod and is open at said top cylinder top and said top cylinder bottom wherein said top cylinder has a top cylinder reduced diameter along a valve stroke length adjacent said top cylinder bottom of said top cylinder;
a main standing valve with a main valve top and a main valve bottom and a main valve central bore open at said main valve top and at said main valve bottom wherein said main valve central bore expands to form a central manifold adjacent said main valve bottom and wherein said main standing valve has at least one opening at said main valve top with a slanted passageway connecting said at least one opening to said central manifold of said main valve central bore;
a donut having an inner diameter and an outer diameter and a varied thickness with a maximum thickness at said inner diameter and a minimum thickness at said outer diameter so as to form a profiled top and slidably disposed on said top cylinder reduced diameter of said top cylinder adjacent said top cylinder bottom and sized to slide on said top cylinder along said valve stroke length between an open position and a closed position wherein said donut seals said at least one opening in said closed position and unseals said at least one opening in said open position wherein said profiled top is configured to limit the accumulation of a sand or a silt on said donut; and wherein said top cylinder bottom is connected to said main valve top so that said central passage and said main valve central bore are aligned with one another so as to receive said polished rod.

2. The superimposed standing valve of claim 1 wherein said at least one opening is a plurality of equally spaced openings encircling said main valve central bore.

3. The superimposed standing valve of claim 2 wherein said plurality of equally spaced openings is each connected to said main valve central bore by a slanted passageway.

4. The superimposed standing valve of claim 3 wherein said top cylinder top is sized to connect to a rod guide.

5. The superimposed standing valve of claim 4 wherein said main valve bottom is sized to connect to a conventional rod pump.

6. The superimposed standing valve of claim 5 wherein said main standing valve has a top cylinder receiver sized to receive said top cylinder bottom.

7. The superimposed standing valve of claim 6 wherein said top cylinder bottom is connected to said top cylinder receiver of said main standing valve and wherein said conventional rod pump is in fluid communication with said central manifold, said slanted passageways and said plurality of equally spaced openings.

8. A method of increasing the efficiency of a conventional rod pump comprising the steps of
 (a) providing a superimposed standing valve comprising:
  a top cylinder with a top cylinder top and a top cylinder bottom with a central passage through said top cylinder wherein said central passage is sized to slidably receive a polished rod and is open at said top cylinder top and said top cylinder bottom;
  a main standing valve with a main valve top and a main valve bottom and a main valve central bore open at said main valve top and at said main valve bottom, at least one opening at said main valve top with a passageway connecting said at least one opening to said main valve bore; and
  a donut having an inner diameter and an outer diameter and a varied thickness with a maximum thickness at said inner diameter and a minimum thickness at said outer diameter so as to form a profiled top and a flat bottom and slidably disposed on said top cylinder adjacent said top cylinder top and sized to slide on said top cylinder between an open position and a closed position wherein said donut seals said at least one opening in said closed position and unseals said at least one opening and wherein said profiled top is configured to limit the accumulation of a sand or a silt on said donut;
 (b) connecting said main valve bottom to said conventional rod pump wherein said conventional rod pump has a plunger within a pump cylinder and having a traveling valve and said conventional rod pump has an inlet with a standing valve and an outlet in fluid communication with said main valve bottom of said superimposed standing valve;
 (c) passing a first end of a polished rod through said central passage of said top cylinder and through said main valve central bore of said main standing valve and into said pump cylinder and connected to said plunger of said conventional rod pump; and
 (d) reciprocating said polished rod up and down to actuate said pump and said superimposed standing valve.

9. The method of claim 8 wherein said at least one opening is a plurality of equally spaced openings encircling said main valve central bore.

10. The method of claim 9 wherein said plurality of equally spaced openings is each connected to said main valve central bore by a slanted passageway.

11. The method of claim 10 wherein said main standing valve has a top cylinder receiver sized to receive said top cylinder bottom.

12. The method of claim 11 wherein said top cylinder bottom is connected to said top cylinder receiver of said main standing valve and wherein said conventional rod pump is in fluid communication with said main valve central bore, said slanted passageways and said plurality of equally spaced openings.

* * * * *